United States Patent
Wills

(10) Patent No.: US 11,805,755 B2
(45) Date of Patent: Nov. 7, 2023

(54) SAFE LAUNCHER-PROJECTILE ASSEMBLY FOR PETS

(71) Applicant: FETCHFIX, LLC, Carrollton, TX (US)

(72) Inventor: Ryan D. Wills, Carrollton, TX (US)

(73) Assignee: FETCHFIX, LLC, Carollton, TX (US)

(*) Notice: Subject to any disclaimer, the term of this patent is extended or adjusted under 35 U.S.C. 154(b) by 914 days.

(21) Appl. No.: 16/399,826

(22) Filed: Apr. 30, 2019

(65) Prior Publication Data

US 2019/0335713 A1  Nov. 7, 2019

Related U.S. Application Data

(60) Provisional application No. 62/665,323, filed on May 1, 2018.

(51) Int. Cl.
*A01K 15/02* (2006.01)
*A63B 59/20* (2015.01)

(52) U.S. Cl.
CPC ............ *A01K 15/025* (2013.01); *A63B 59/20* (2015.10); *A63B 2208/14* (2013.01)

(58) Field of Classification Search
CPC .. A01K 15/025; A63B 59/20; A63B 2208/14; F41B 3/00
USPC ............................................................ 124/5
See application file for complete search history.

(56) References Cited

U.S. PATENT DOCUMENTS

| | | | |
|---|---|---|---|
| 5,388,825 A * | 2/1995 | Myers | A63B 43/06 473/570 |
| 6,477,745 B2 | 11/2002 | Stre8l | |
| 8,683,958 B2 * | 4/2014 | Oblack | A63B 37/12 119/707 |
| 8,701,640 B2 | 4/2014 | Smit | |
| D783,743 S * | 4/2017 | Wills | A01K 15/025 D21/707 |
| D817,562 S * | 5/2018 | Markham | A01K 15/025 D21/713 |
| 2005/0070198 A1 | 3/2005 | Pickering et al. | |
| 2008/0004140 A1* | 1/2008 | Matsumoto | A01K 15/025 473/513 |
| 2012/0006309 A1* | 1/2012 | Levin | A01K 39/014 124/5 |
| 2012/0279459 A1* | 11/2012 | Angle | A01K 15/026 119/707 |
| 2013/0167778 A1* | 7/2013 | Perry | A01K 15/025 119/707 |
| 2013/0192535 A1 | 8/2013 | Smith | |

(Continued)

FOREIGN PATENT DOCUMENTS

WO  WO-2019/213168 A1  11/2019

OTHER PUBLICATIONS

PCT Pat. Appl. No. PCT/US2019/030057, Foreign Search Report dated Jul. 12, 2019, 9 pgs.

*Primary Examiner* — Joshua D Huson
*Assistant Examiner* — Edgar Reyes
(74) *Attorney, Agent, or Firm* — Foley & Lardner LLP

(57) ABSTRACT

This disclosure describes a launcher and a projectile for fetch games with pets. The launcher, in certain implementations, may be used to pick up and launch the projectile that has a core to engage with a head of the launcher. Same size cores may be used in projectiles of different sizes, appearances, shapes, and materials (for different pets) such that a common launcher can be used.

19 Claims, 12 Drawing Sheets

(56) References Cited

U.S. PATENT DOCUMENTS

| | | | |
|---|---|---|---|
| 2013/0284158 A1* | 10/2013 | Hansen | A63B 65/122 124/5 |
| 2014/0130750 A1* | 5/2014 | Valle | A01K 15/026 119/708 |
| 2015/0020748 A1* | 1/2015 | Wechsler | A01K 15/025 119/711 |
| 2015/0090237 A1* | 4/2015 | Williams | A63B 65/122 124/16 |
| 2015/0283432 A1* | 10/2015 | Sullivan | A63B 37/00922 473/376 |
| 2017/0112099 A1* | 4/2017 | Hartelius | A01K 15/025 |
| 2017/0290296 A1* | 10/2017 | Simon | A01K 15/026 |
| 2019/0297848 A1* | 10/2019 | Gao | A01K 15/025 |

\* cited by examiner

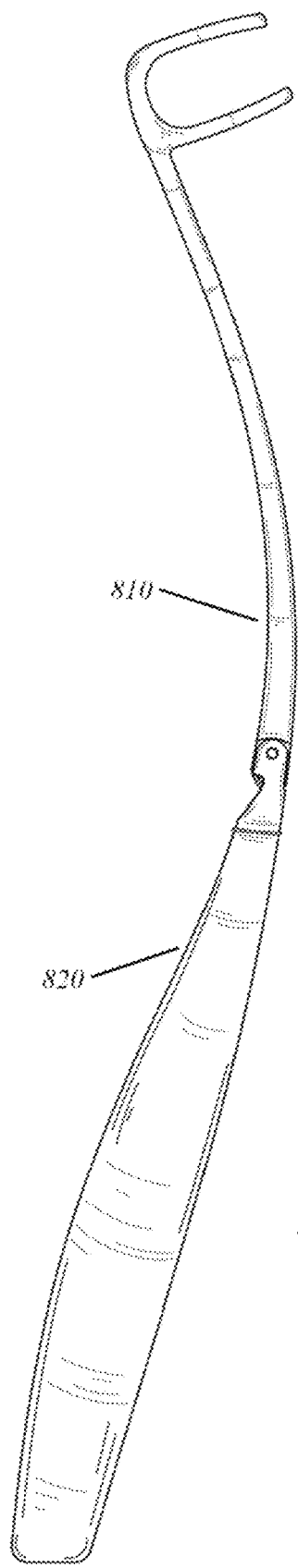
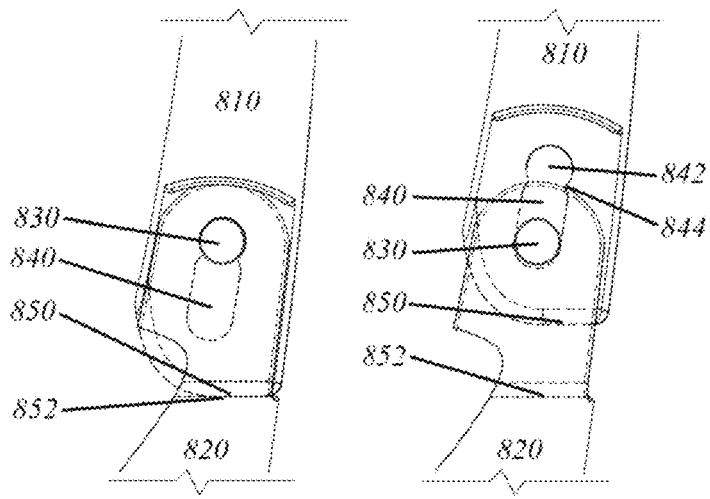
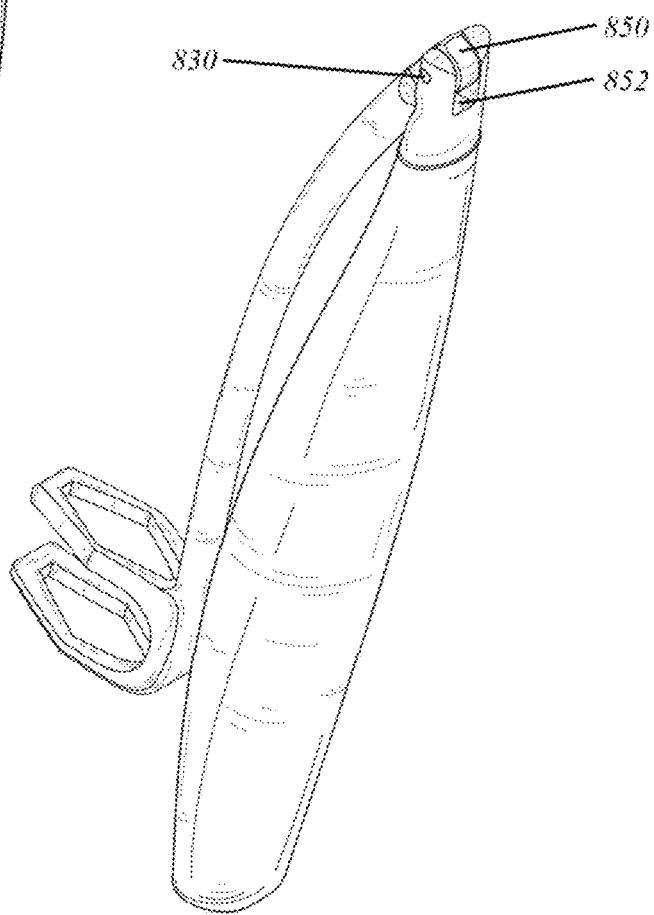
FIG. 8A  FIG. 8B  FIG. 8C  FIG. 8D

SAFE LAUNCHER-PROJECTILE ASSEMBLY FOR PETS

CROSS REFERENCE TO RELATED APPLICATION

This application is related to and claims priority to U.S. Provisional Patent Application No. 62/665,323, entitled "Safe Launcher-Projectile Assembly for Pets," filed on May 1, 2018, which is herein incorporated by reference in its entirety and for all purposes.

FIELD

This disclosure relates to interactive pet toys.

BACKGROUND

Some pets, often dogs, love playing fetch. In a fetch game, a pet owner throws a stick, flying disc, or ball for a distance away from the pet. The pet then runs to grab and may return the thrown object.

Some pet owners, such as children or disabled persons, may not be able to throw an object very far. Such persons may use an additional hand held tool to increase the throwing distance. For example, an extended tool holding a tennis ball may enable a pet owner to throw the tennis ball farther, by reaching a high linear speed at the outer end of the extended tool, thus increasing the pet's running distance and return time for each throw. Such extended tools are designed to hold one specific object, such as, for example, a tennis ball.

After the pet retrieves the thrown object, the pet may drop the object in front of the owner, rather than holding the object in its mouth for the owner to take away, as a signal for another fetch. The owner may have trouble bending down or moving to pick up the object on the ground, repetitively or otherwise. If an extended tool is used, the owner may also need to first pick up the object, then mount the object to the extended tool, a two-step process that can be difficult, and time consuming.

Balls are often used in fetch games because they bounce in predictable directions and may continue to travel a longer distance after first landing, unlike sticks or flying discs. Some balls are comfortable for pets, such as dogs, to retrieve in their mouth, but certain sized balls may present serious choke hazards. For example, a big dog may accidently swallow a tennis ball when attempting to grip the ball in its mouth; while a puppy may have difficulty biting on the same sized tennis ball. If a ball is stuck in a dog's throat, the dog may suffocate.

SUMMARY

This disclosure describes a launcher and a projectile for fetch games with pets. The launcher can be used to pick up and launch the projectile that has a core to engage with a head or coupler of the launcher. Same size or launcher compatible cores may be used in projectiles of different sizes, appearances, shapes, and materials (for different pets) such that a common launcher can be used. Specific features of certain embodiments the launcher and projectile are summarized below.

A launcher-projectile assembly includes a launcher having a head engaging a projectile. The projectile has a core and two or more outer members, the two or more outer members forming at least one channel having a bottom surface, a first side wall, and a second side wall, wherein the bottom surface is an outer surface of the core, the first side wall is a side surface of one of the two or more outer members, and the second side wall is a side surface of the other one of the two or more outer members. The head of the launcher contacts the bottom surface of the at least one channel and is at least partially laterally constrained by one of at least the first side wall and the second side wall, such that the head holds at least or more than the projectile's static gravitational weight.

In some embodiments, the launcher further includes an arm and a handle, wherein the arm connects the head to the handle, the arm being bowed and configured to flex when launching the projectile.

In yet some other embodiments, the handle includes a clip shape, the clip shape forming a slot such that an open end of the handle is insertable into a pocket or a belt of a user.

In some embodiments, the handle is formed in an ergonomic grip profile including a thumb rest for receiving a thumb. In other embodiments, the handle may also be formed in an ergonomic grip profile including a number of finger indentations for receiving fingers and a thumb rest contoured for receiving a thumb.

In some other embodiments, the arm is telescopically extendable.

In yet some other embodiments, the arm is hinged such that the launcher is foldable to reduce an overall length, and is more easily transported.

In some embodiments, the head has a "C" shaped profile defined by an inner radius, a width, and a thickness. The core of the projectile has at least one cross-sectional shape having a circle with a radius about the same as the inner radius of the "C" shaped profile. The core of the projectile may have two cross-sectional circular shapes both having a radius about the same as the inner radius of the "C" shaped profile.

In some embodiments, the two or more outer members of the core include outer surfaces forming a spherical-like exterior shape with one or more channels, the spherical-like exterior shape having a radius greater than the inner radius of the "C" shaped profile. The outer members are made of a flexible material configured for pets to bite. At least one channel forms an air passage way in case the projectile is stuck inside a pet's throat.

In some embodiments, the width of the head is equal to or less than a distance between the first side wall and the second side wall. The width of the head is elastically deformable and greater than a distance between the first side wall and the second side wall for the head to engage the channel by friction.

In some other embodiments, the arm is more elastically bendable backward than elastically bendable forward and configured to fling the projectile from the head.

In yet some other embodiments, the outer members are mechanically connected to the core. In some instances, the outer members are also chemically connected to the core. In some implementations, two or more outer members are connected to each other through the core. For example, the core may include hollow channels and the outer members may be directly molded on the core during an injection molding process. By selecting chemically bondable materials, the outer members and the core may also be chemically bonded during the injection molding process.

In some other embodiments, the arm of the launcher includes a spine or a rib for reinforcement. For example, the spin or rib may be used to increase the bending stiffness of the launcher. This may enable using less material and reducing the overall weight of the launcher.

In yet some other embodiments, the at least one channel of the projectile includes three channels between the outer members, the three channels positioned orthogonal to each other.

In some embodiments, the three channels intersect at multiple stable points.

In some other embodiments, the first side wall and the second side wall are not parallel to each other and form a flaring angle.

In a second general aspect, a launcher includes a handle; a head configured to engage a projectile, wherein the projectile has a core and two or more outer members, the two or more outer members forming at least one channel having a bottom surface, a first side wall, and a second side wall, wherein the bottom surface is an outer surface of the core, the first side wall is a side surface of one of the two or more outer members, and the second side wall is a side surface of the other one of the two or more outer members, and wherein the head contacts the bottom surface of the at least one channel and is laterally constrained by one of at least the first side wall and the second side wall, such that the head holds more than the projectile's static gravitational weight; and an arm connecting the handle to the head.

In some embodiments, the handle is formed in an ergonomic grip profile including a number of finger indentations for receiving fingers and a thumb rest contoured for receiving a thumb.

In some embodiments, the arm is extendible or foldable for reducing overall length when stored.

In a third general aspect, a projectile includes a core; and two or more outer members, the two or more outer members forming at least one channel having a bottom surface, a first side wall, and a second side wall, wherein the bottom surface is an outer surface of the core, the first side wall is a side surface of one of the two or more outer members, and the second side wall is a side surface of the other one of the two or more outer members; and wherein the at least one channel is configured to receive a head of a launcher, wherein the head contacts the bottom surface of the at least one channel and is laterally constrained by one of at least the first side wall and the second side wall, such that the head holds more than the projectile's static gravitational weight.

In some embodiments, the core of the projectile has two cross-sectional circular shapes both having a radius about the same as an inner radius defining a "C" shaped profile of the head of the launcher.

Detailed disclosure and examples are provided below.

BRIEF DESCRIPTION OF FIGURES

FIGS. 8A, 8B, 8C, and 8D show another embodiment of an arm of the launcher of FIG. 1.

Like elements are labeled using like numerals.

DETAILED DESCRIPTION

Figure 1:
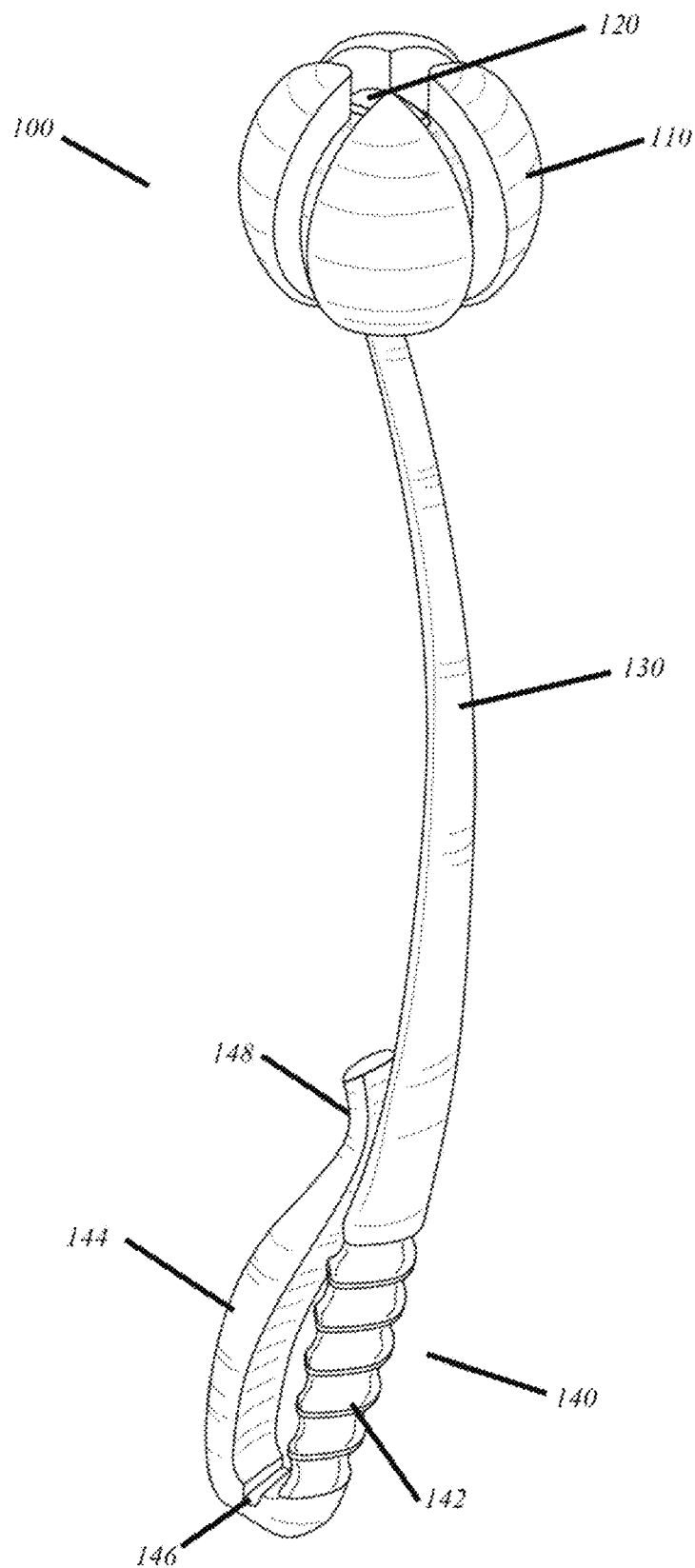
FIG. 1 is a perspective view of an embodiment of a launcher-projectile assembly.

This disclosure presents a launcher and a projectile for fetch games with pets. FIG. 1 is a perspective view of an embodiment of the launcher-projectile assembly. The assembly includes the launcher 100 and the projectile 110. The launcher 100 includes a head 120, an arm 130, and a handle 140. The arm 130 connects the handle 140 to the head 120. The head 120 engages the projectile 110 and holds more than the projectile's static gravitational weight. For example, a user may pick up the projectile 110 by clipping, for example, the head 120 onto the projectile 110 and, when launching, release the projectile 110 when its momentum overcomes the restraining forces imposed by the head 120. In some embodiments, the arm 130 is bowed and configured to flex when launching the projectile 110. For example, when a user swings the launcher 110 by holding the handle 140, the launcher 100 performs like a cantilever beam bent by an inertial force resulted from acceleration. The inertial force flexes the arm 130 and stores energy during acceleration. When releasing the projectile 110, movement of the handle 140 is suddenly halted and the launcher 100 catapults, whips, or flings the projectile 110 out of the head 120. At such moment, the stored energy in the arm 130 is converted into kinetic energy of the projectile 110, enabling it to travel at high velocities. In some embodiments, the arm 130 is more elastically bendable backward than elastically bendable forward due to its bow shape.

This disclosure describes two embodiments of the head 120 engaging the projectile 110 below, one embodiment having the head 120 elastically deform for fitting the projectile 110 to the head 120 in its original, undeformed, shape (as illustrated in FIG. 1); another embodiment having the head 120 elastically deform for creating a static frictional engagement force (e.g., a tight or interference fit, as illustrated in FIG. 8). Other variations are possible, such as using magnetic forces, Velcro tapes, adhesive tapes, or glue.

The handle 140 includes a general clip shape that forms a slot such that an open end of the handle 140 can be inserted into a pocket or a belt of a user. The handle 140 is formed in an ergonomic grip profile 144 that includes a number of finger indentations 142 for receiving fingers and a thumb rest 148 for receiving a thumb. In some instances, a clip receiver 146 is also formed in the handle 140 for mounting an accessory holder (see FIG. 4), for example, for holding additional projectiles 110.

Figure 2:
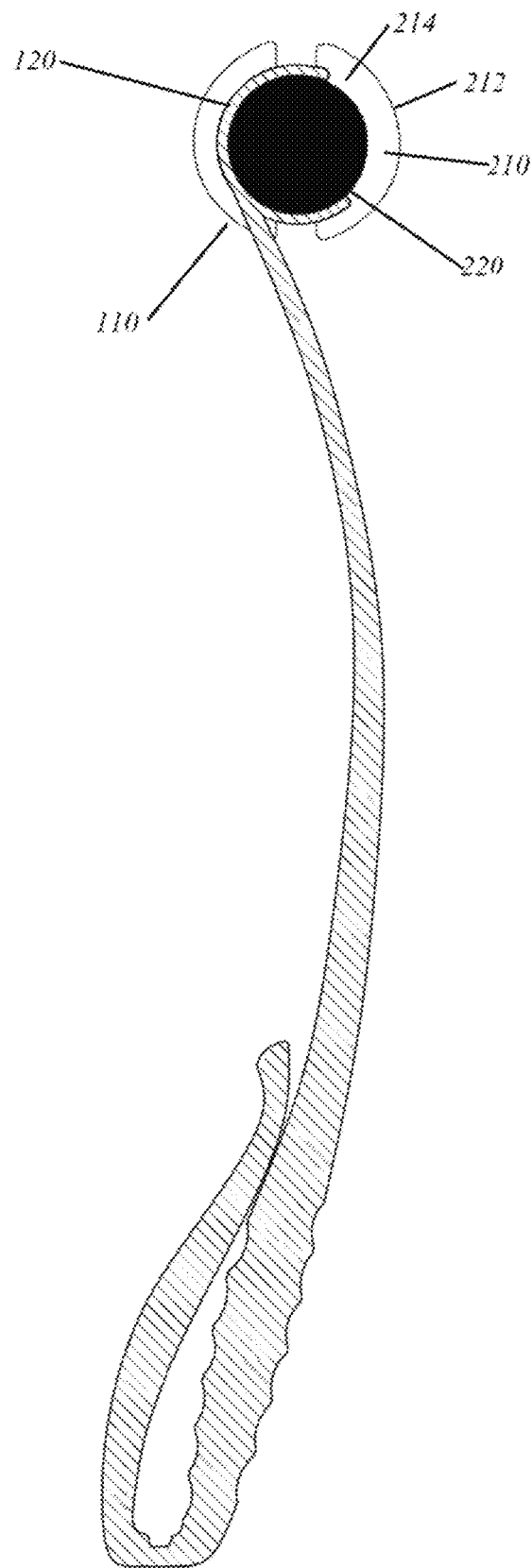
FIG. 2 is a cross-sectional side view of the launcher-projectile assembly of FIG. 1.

FIG. 2 is a cross-sectional side view of the launcher-projectile assembly of FIG. 1, illustrating the mounting engagement between the projectile 110 and the head 120. The projectile 110 includes a core 220 and two or more outer members 210. The head 120 has an inner profile that matches the outer profile of the core 220 for engagement. For example, the head 120 has a "C" shaped profile defined by an inner radius, a width (i.e., measured in front view), and a thickness. The "C" shaped profile can elastically bend to increase the opening to accept the core 220. Such flexibility may be adjusted by varying the width or the thickness defining the "C" shaped profile.

In the example illustrated in FIG. 2, the core 220 has at least one cross sectional shape having a circular perimeter of a radius about the same as the inner radius of the "C" shaped profile. In other embodiments, the core 220 can have two or more cross sectional shapes having a circular perimeter of a radius about the same as the inner radius of the "C" shaped profile. For example, the core 220 may be formed by orthogonally intersecting two cylindrical shapes having the same radius about the same as the inner radius of the "C" shaped profile. Such configuration increases the number of orientation choices for the head 120 to engage the core 220. In some embodiments, the core 220 may be spherical in shape and the "C" shaped profile of the head 120 may have a mating spherical inner surface to engage the core 220. In yet some other embodiments, as discussed in another embodiment below, the core 220 may have a non-circular cross-sectional shape for engaging the head 120 of other different shapes.

In some embodiments, the core 220 is made of a rigid material that does not significantly deform when a pet, such as a dog, bites onto the projectile 110. The rigid material can be any type of hard plastic or polymer based material, or the like. Due to the high rigidity of the core 220, the core 220 provides a rigid surface for attaching to the head 120 of the launcher 100 and avoiding permanent deformation during normal use of the launcher 100. The rigidity of the core 220 maintains the fitting relationship, such as a snap-on fit or a friction fit, between the core 220 and the launcher 100, over a long period of time. For example, the head 120 and the core 202 are made of a material having a high elastic modulus (such as a thermoplastic having a high molecular weight) such that insignificant, minimal, or unnoticeable plastic deformations occur over time, and that the snap-on fit between the core 220 and the head 120 is maintained.

In addition, the rigid material of the core 220 may provide a suitable substrate for a strong bonding using mechanical means, chemical means, or both. For example, by using chemical means, the rigid material of the core 220 may be polypropylene and the outer members 210 may be made of thermoplastic elastomer that is directly molded on the core 220. In some embodiments, the core 220 and the outer members 210 are injection molded in a single process. As such, the two portions having different mechanical properties are formed together without subsequent adhesion or assembly steps.

For another example, by using mechanical means, the rigid material of the core 220 need not be bondable with the materials forming the outer members 210. The core 220 may be hollow, such as including channels for allowing the two or more outer members 210 to connect with each other during injection molding. As such, the two or more outer members 210 are interlocked with the core 220, even without any bonding therebetween. In other implementations, the material selection and injection molding configuration for the core 220 and the outer members 210 may enable the use of both chemical and mechanical means in forming the projectile 110. Specific examples are provided in FIGS. 12-15 and the corresponding descriptions.

The projectile 110 formed of the core 220 and the outer members 210 is overall a solid piece because the core 220 and the outer members 210 are molded together, not leaving gaps or spaces therebetween. Such configuration reduces or eliminates the potential of a pet's tongue getting stuck inside the projectile 110. By comparison, prior pet toys are often hollow and may create suction when released from a bite and may trap in a tongue of a pet, or may crack due to the hollowness and do harm to the tongue.

Figure 3:
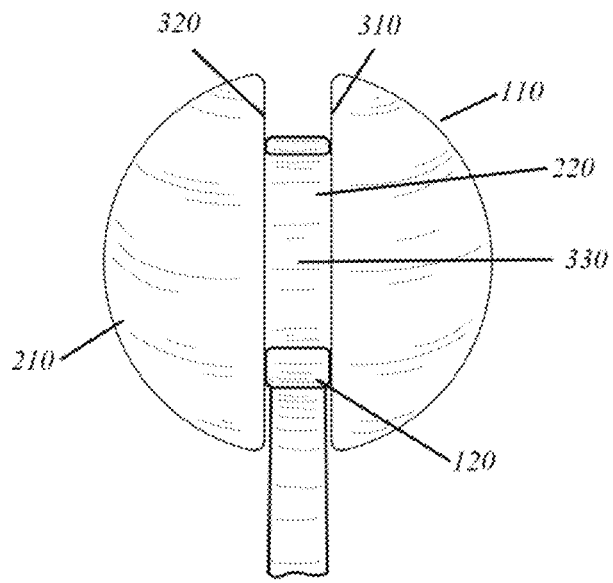
FIG. 3 is a front local view of the launcher-projectile assembly of FIG. 1 showing engagement between the head of the launcher and the projectile.

FIG. 3 is a front local view of the launcher-projectile assembly of FIG. 1 showing engagement between the head 120 of the launcher 100 and the projectile 120. The two outer members 210 and the core 220 form a channel that has a first side wall 310, a second side wall 320, and a bottom surface 330. The first side wall 310 and the second side wall 320 are side surfaces of the outer members 210. The head 120 contacts the bottom surface 330 of the channel between the outer members 210. The head 120 is laterally constrained by one of at least the first side wall 310 and the second side wall 320. For example, the width of the head may be substantially equal to or less than the distance between the first side wall 310 and the second side wall 320. In some embodiments, the first side wall 310 and the second side wall 320 are not parallel to each other and form a flaring angle, for easy engagement by the head 120 of the launcher 100.

The outer members 210 include outer surfaces 212 forming a spherical-like exterior shape with one or more channels 214. The spherical-like exterior shape has a radius greater than the inner radius of the "C" shaped profile of the head 120. In some embodiments, the outer members 210 are made of a flexible material for pets to bite. For example, the outer members 210 may be made of rubber, polymer, or other durable and elastic materials. The one or more channels 214 serve at least two purposes. First, the channels 214 expose the core 220 for the head 120 to engage thereon. Second, the channels 214 form air passage ways in case the projectile 110 is stuck inside a pet's throat.

In some embodiments, the outer surfaces 212 and the bottom surface 330 may have different colors for pets' and their owners' respective attention. For example, dogs have only two color sensitivities (yellow and blue) while humans have three (red, green and blue). In some embodiments, the outer surfaces 212 have a color more perceptive to dogs, such as blue, while the bottom surface 330 has a color more perceptive to human, such as white (a mixture of all red, green and blue). In such color scheme, a human user of the launcher 100 can better target the channels 214 using the visual cue provided by the bottom surface 330 to engage the head 120 with the core 220, while a dog can better target the outer members 210.

Figure 4A:
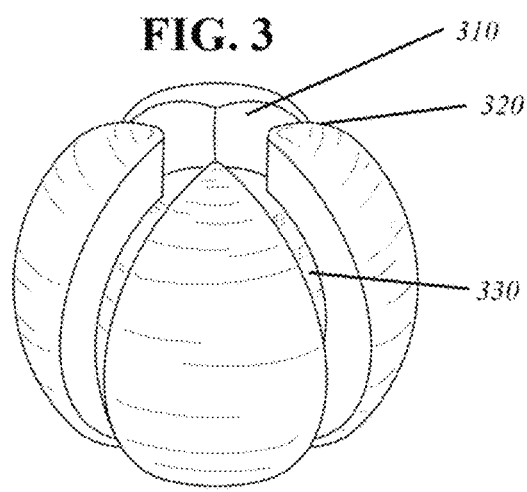
FIGS. 4A and 4B are perspective views of the projectile of FIG. 1 in different embodiments.
Figure 4B:
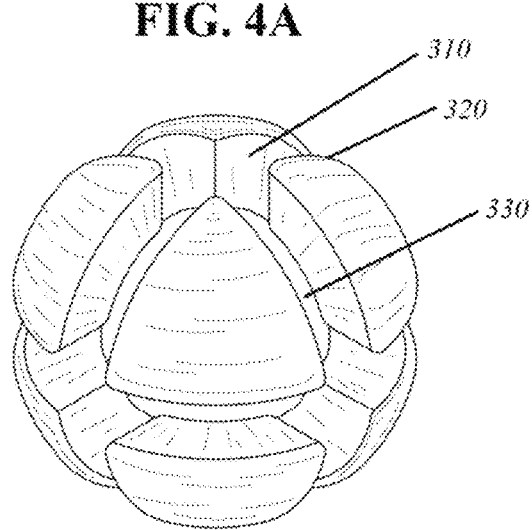

FIGS. 4A and 4B are perspective views of the projectile 110 of FIG. 1 in different embodiments. FIG. 4A illustrates an embodiment of two circumferential channels and FIG. 4B illustrates an embodiment of three circumferential channels. The shape of circumferential channels may be different than the illustrations because the outer members 210 may be of different shapes. For example, although FIGS. 4A and 4B illustrates the outer members 210 having substantial spherical shape, with channels cut out, the outer members 210 may form in other shapes, such as ovoid, cubical, prolate spheroid, among others.

With the channels, the outer members 210 form edges and corners that the projectile 110 is more likely to rest one, because of the lowered center of gravities at those positions.

For example, at an intersection of two channels, the outer members 210 form four corners (also known as "stable point") that enable the projectile 110 to stand on a flat surface. As such, when playing fetch at a parking lot, after a pet drops the projectile near the pet owner, the projectile is more likely to stand on the four corners because of its stability. Such tendency helps a user to use the launcher 100 alone to snap the head 120 onto the one of the channels when the projectile 110 rests on the ground.

Figure 5:
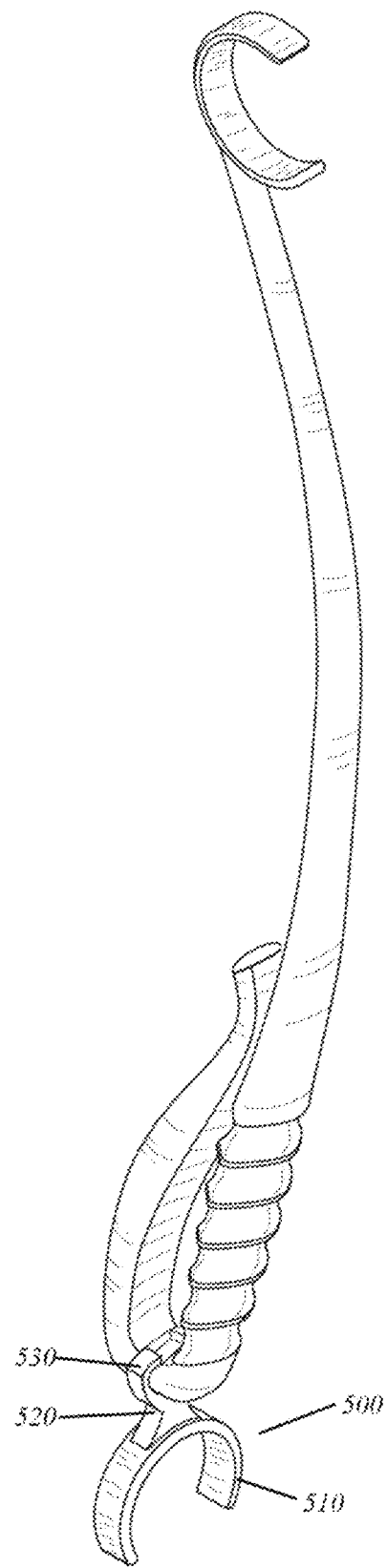
FIG. 5 is a perspective view of the launcher with an accessory clip.

FIG. 5 is a perspective view of the launcher with an accessory clip 500. Like the head 120, the accessory clip 500 also has a "C" shaped profile 510 for holding a spare projectile. The two "C" shaped profiles may have similar radii but other parameters (such as thickness) may be different, for example, to make the accessory clip 500 more secure in holding a spare projectile. The accessory clip 500 further includes a neck 520 and claws 530 for engaging the clip receiver 146 of the handle 140. The neck 520 connects the "C" shaped profile 510 to the claws 530.

Figure 6:
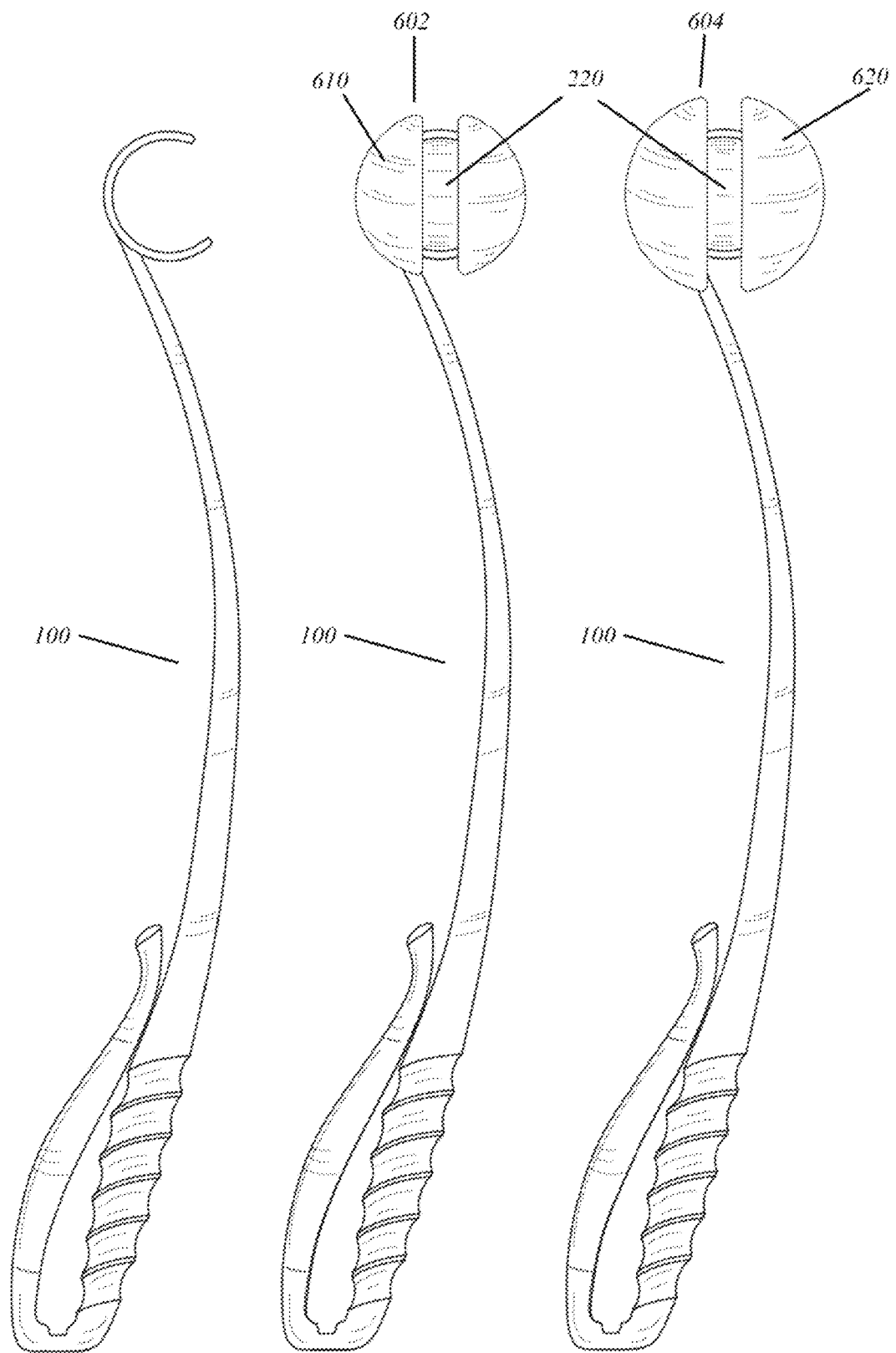
FIG. 6 illustrates a common launcher used to fit projectiles of differently sized outer members.

FIG. 6 illustrates a common launcher 100 used to fit projectiles of differently sized outer members. For example, both projectiles 602 and 604 have the same sized cores 220. But the outer member 610 has a smaller outer profile (e.g., a smaller spherical radius) than that of the outer member 620. Such variation allows the same launcher 100 to be used with projectiles of different sizes and shapes, tailoring to the pets' specific needs. For example, large pets favor large projectiles while small pets prefer small projectiles. Similarly, the shape and other exterior properties (such as color, texture, etc.) of the outer members 610, 620 can vary while the core 220 is kept a constant. Such compatibility to different projectiles provides the launcher 100 great versatility.

Figure 7A:
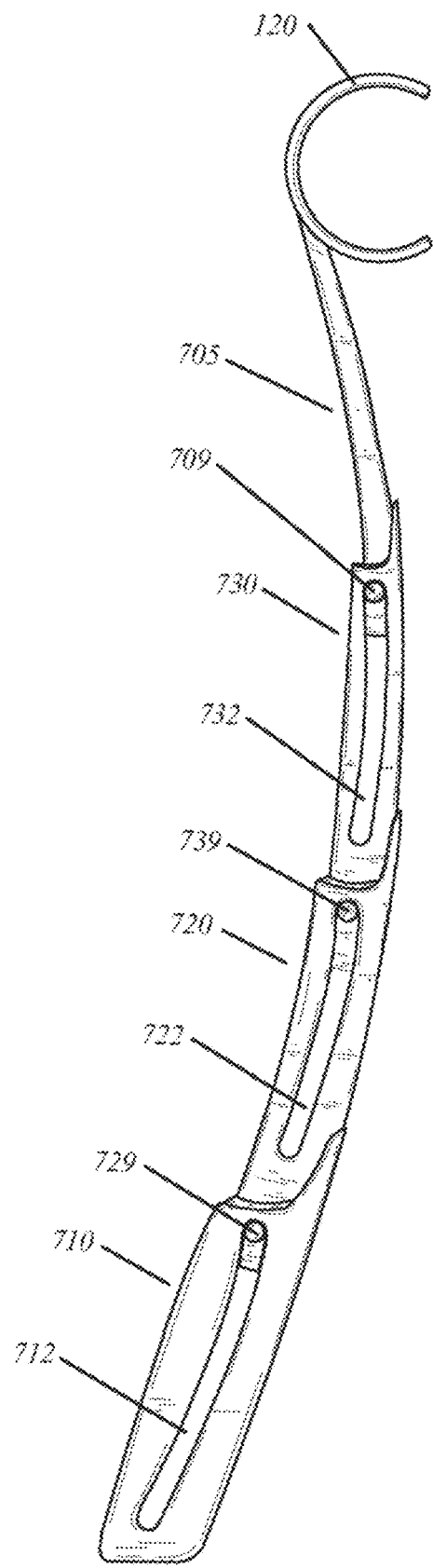
FIGS. 7A and 7B show a second embodiment of an arm of the launcher of FIG. 1.
Figure 7B:
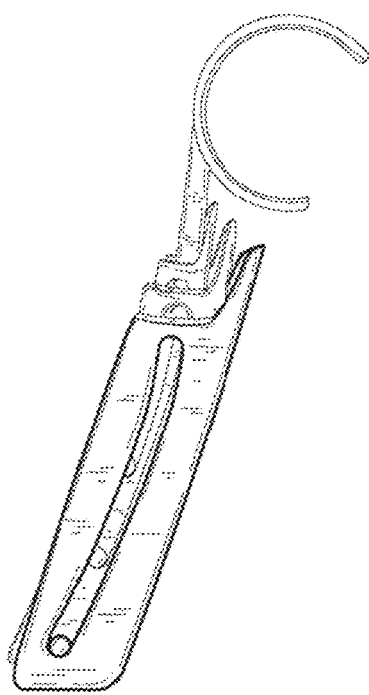

FIGS. 7A and 7B show a second embodiment of an arm of the launcher of FIG. 1. FIG. 7A illustrates the launcher in a fully extended mode and FIG. 7B illustrates the launcher in a collapsed mode. In this embodiment, the arm and handle of the launcher are formed by four telescopically extendable and collapsible sections 705, 710, 720, and 730. Section 730 is hollow and provides sufficient space to enclose section 705, which connects to the head 120. Section 705 includes an extruded structure 709 to slidingly engage with the slot 732 of the section 730. For example, the extruded structure 709 may have a cylindrical shape. Slot 732 constrains the movement of the extruded structure 709 by defining its travel distance and end points. Similar to section 730, section 720 is hollow and provides sufficient space to enclose section 730. Section 730 also includes an extruded structure 739 for engaging with a slot 722 of section 720. Section 710 is hollow and provides sufficient space to enclose section 720. The extruded structure 729 engages a slot 712 of section 710. Although FIGS. 7A and 7B illustrates the extendable arm and handle having four sections 705, 710, 720, and 730, in other embodiments, the arm and handle may include different numbers and lengths of sections for specific launchers.

FIGS. 8A, 8B, 8C, and 8D show another embodiment of an arm of the launcher of FIG. 1. FIG. 8A illustrates an unfolded launcher having the arm and handle formed by an upper portion 810 and a lower portion 820. Though not illustrated, in some embodiments, the lower portion 820 may include similar features, such as the thumb rest 148 and finger indentations 142, as the handle 140 of FIG. 1. FIG. 8B illustrates in detail the locked joint of the unfolded launcher shown in FIG. 0.8A. FIG. 8C illustrates the unlocked joint of the launcher when the upper portion 810 is pulled upward and released from the lower portion 820. After the upper portion 810 is released from the lower portion 820, the launcher can be folded in half as shown in FIG. 8D.

Turning to FIGS. 8B and 8C, the upper portion 810 includes a slot 840 that further includes a locking stop 844 and a stay space 842. The locking stop 844 provides a compressive force against a shaft 830 affixed onto the lower portion 820. For example, the locking stop 844 has a narrowed opening smaller than the diameter of the shaft 830. The stay space 842 may provide support for the shaft 830 as an end stop, working together with the locking stop 844 to prevent relative translational movement between the upper portion 810 and the lower portion 820.

The upper portion 810 further includes an end surface 850 for mating with a surface 852 of the lower portion 820. When the launcher is locked in the unfolded mode as in FIGS. 8A and 8B, the end surface 850 and the surface 852 contact each other to provide the compressive force generated at the locking stop 844 and prevent the upper portion 810 from rotating about the shaft 830. When the launcher is unlocked, as shown in FIGS. 8C and 8D, the upper portion 810 is disengaged from the lower portion 820 and can rotate about the shaft 830. For example, the upper portion 810 is displaced away from the lower portion 820 such that the shaft 830 moves from the stay space 842 to other non-restricted spaces of the slot 840. As such, the clearance between the end surface 850 and the surface 820 enables free rotation of the upper portion 810 with respect to the lower portion 820. FIG. 8D shows that the upper portion 810 is folded toward the lower portion 820 such that the total length of the launcher is reduced to that of the lower portion 820

Figures 9A, 9B:
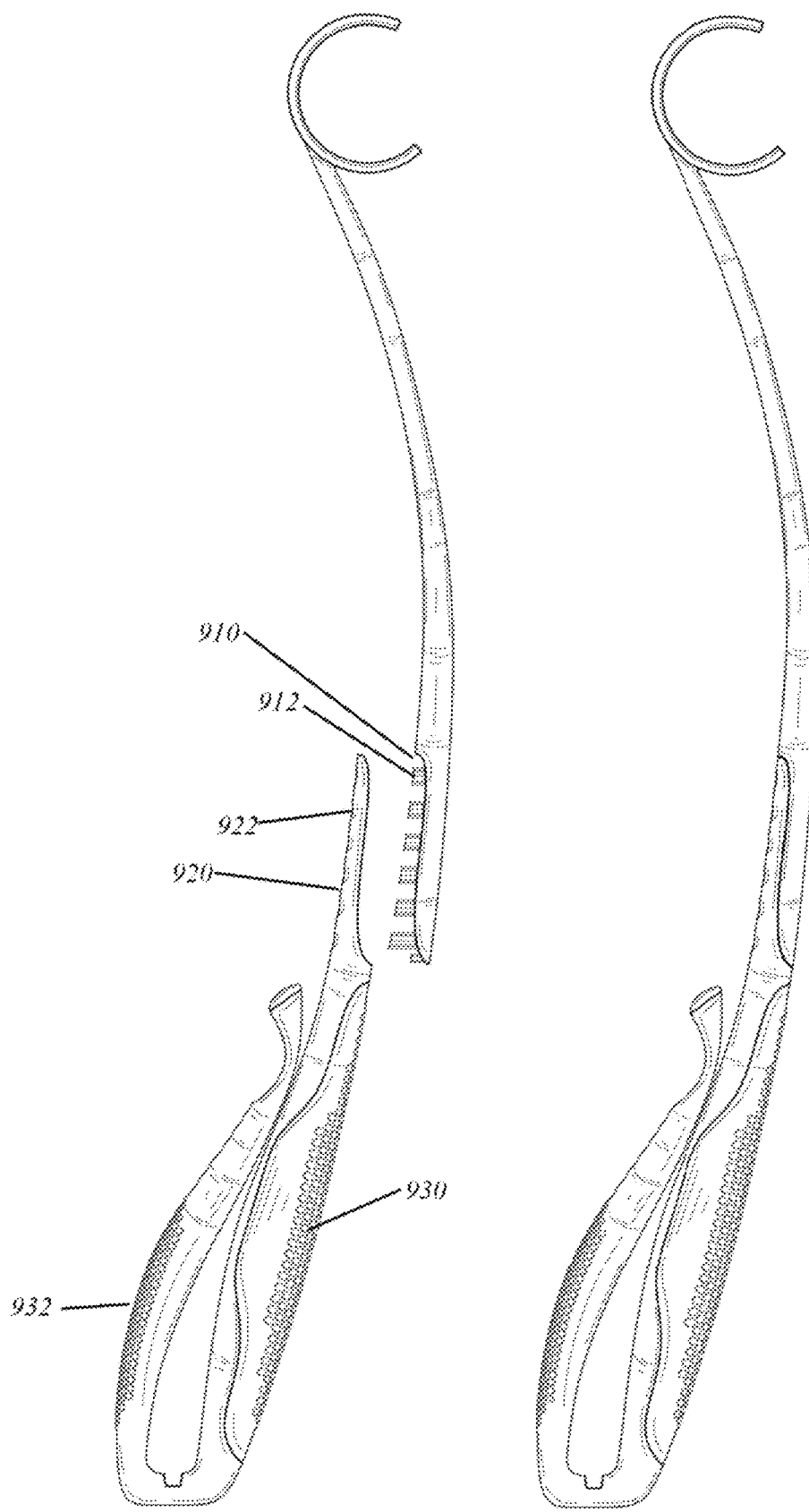
FIGS. 9A and 9B show another embodiment of an arm of the launcher of FIG. 1.

FIGS. 9A and 9B show yet another embodiment of an arm of the launcher of FIG. 1. In this embodiment, the launcher can be separated into two or more sections at the arm location. As illustrated in FIG. 9A, the arm's upper portion 910 includes one or more pegs 912 for insertion into corresponding holes 922 of the lower portion 920. When assembled as shown in FIG. 9B, the pegs 912 and the holes 922 hold the upper portion 910 and lower portion 920 together for launching operations. In some embodiments, the pegs 912 and the holes may use an interference fit for assembly. In other embodiments, magnets, adhesives, or other bonding methods may be used.

As illustrated in FIG. 9A, the handle of the launcher may include texture patterns 930 and 932 for improved grip. The various embodiments illustrated in FIGS. 1, 7A, 8A, and 9A may be combined or varied according to specific needs, such as storage space, fully extended length, flexibility, and strength for launching large or heavy projectiles. For example, a portion of the launcher 100 may include a telescopic mechanism as shown in FIG. 7A, another portion of the launcher 100 may include the folding mechanism as shown in FIG. 8A; and yet another portion of the launcher 100 may include a sectional assembly mechanism as shown in FIG. 9A. In other embodiments, the handle 140 may include both the indentation patterns 142 and the texture patterns 930. Other combinations and variations are possible.

Figures 10A, 10B:
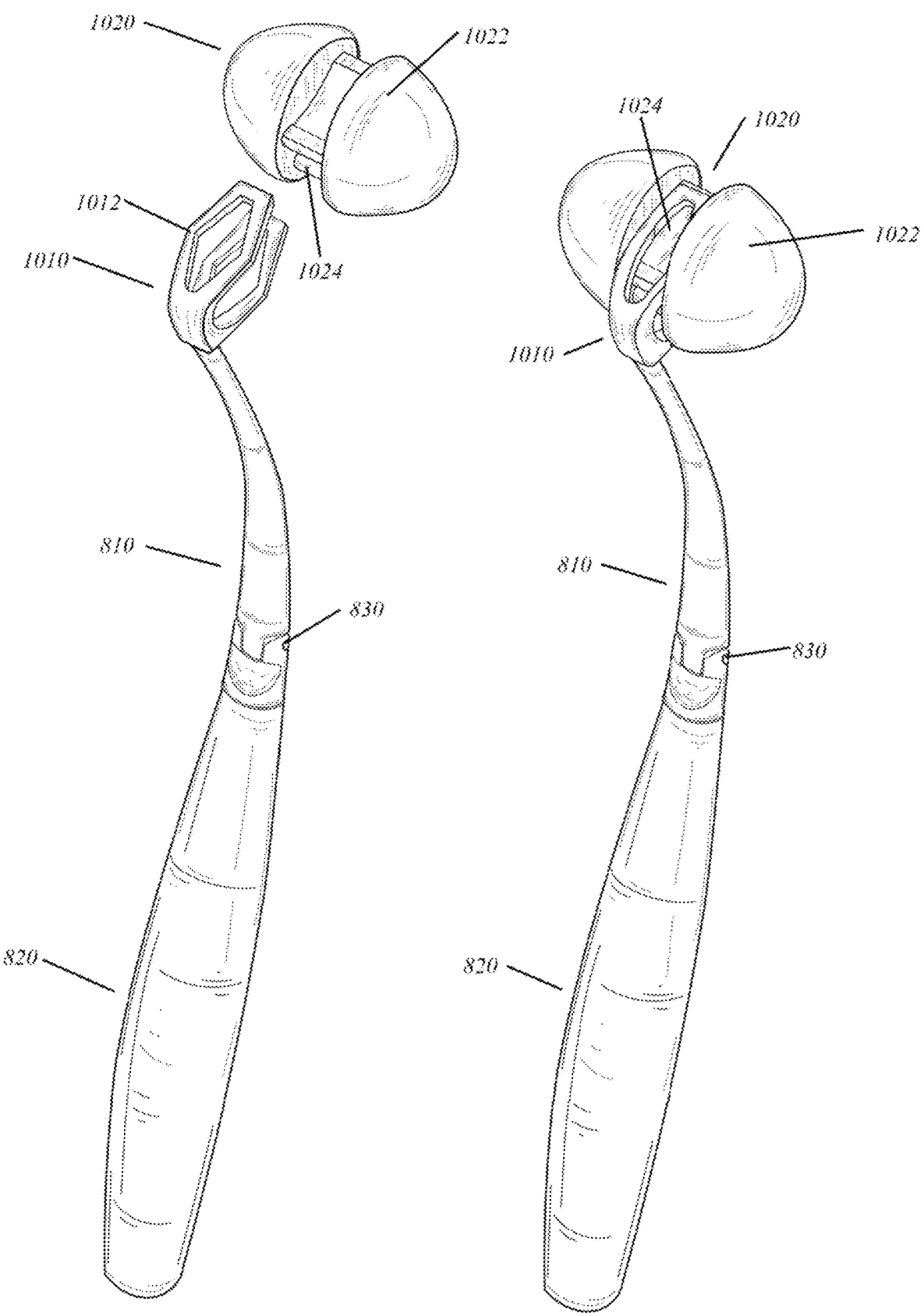
FIGS. 10A and 10B show another embodiment of a launcher-projectile assembly.

FIGS. 10A and 10B show another embodiment of a launcher-projectile assembly. Different from the previous embodiment shown in FIG. 1, this embodiment uses the flexibility of the head 1010 to engage side walls (instead of the core 1024) of the outer members 1022 of the projectile 1020. The head 1010 includes a hollow structure that can be elastically deformed. When the head 1010 is inserted into the outer members 1022, the elastic deformation causes friction between the head 1010 and the outer members 1022.

This friction allows the head 1010 to lift up the projectile 1020 but can also be overcome by the momentum of the projectile 1020 at high speeds. The core 1024 provides a guide for the head 1010 to engage the outer members 1022.

Figure 11A:
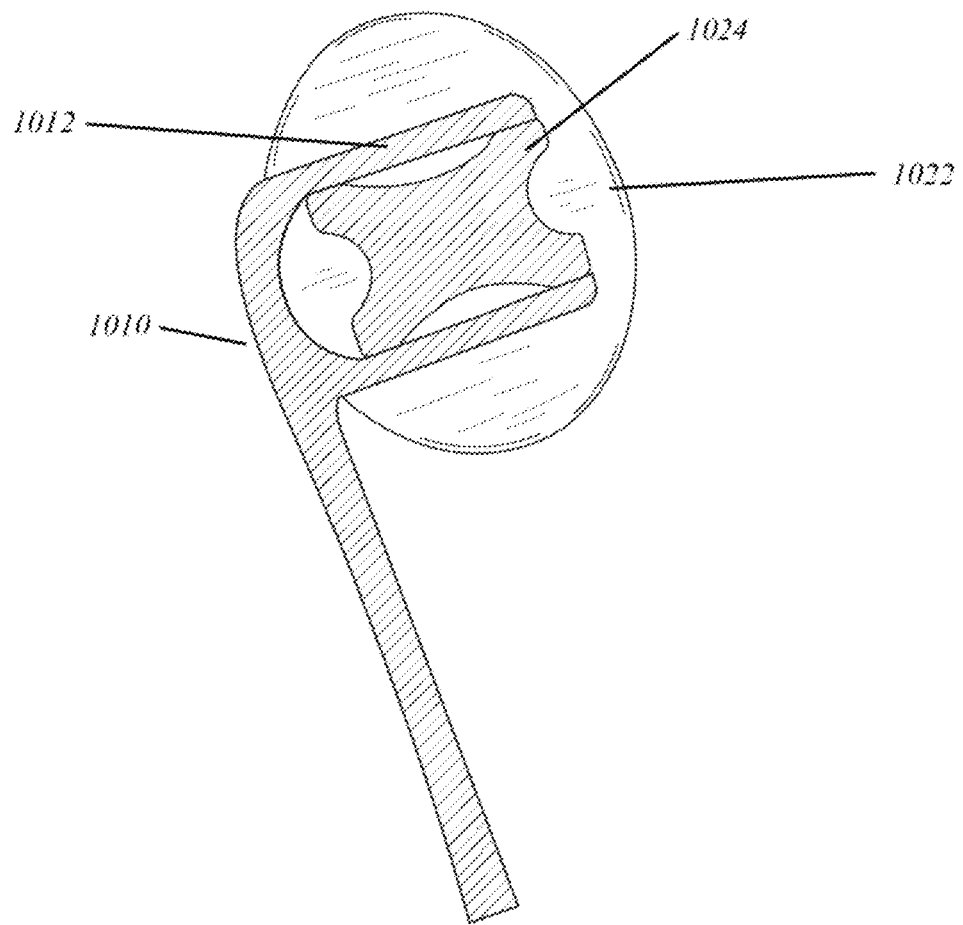
FIGS. 11A and 11B are local views of the launcher-projectile assembly of FIG. 10B illustrating the engagement between the head of the launcher and the projectile.
Figure 11B:
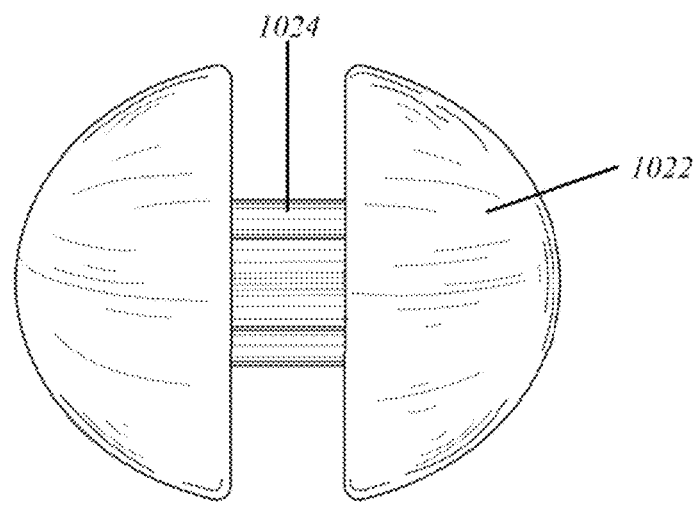

FIGS. 11A and 11B are local views of the launcher-projectile assembly of FIG. 10B illustrating the engagement between the head 1010 of the launcher and the projectile 1020. FIG. 11A is a cross sectional side view that further illustrates the structures of the head 1010. In the illustrated embodiment, the head 1010 includes hollow arms 1012 that are guided by the core 1024 during insertion. The core 1024 includes curvy surfaces such that the arms 1012 may engage the projectile 1020 at various angles. In the illustrated embodiment, the projectile 1020 is shaped as an ovoid such that the projectile 1020 has a natural tendency to stop on the ground with the engagement direction facing up for receiving the arms 2012. FIG. 11B provides a side view of the ovoid projectile 1020. In some embodiments, the projectile 1020 may be color coded in a similar way as the projectile 110.

Turning now to FIGS. 12-15, FIG. 12 is a perspective view of another embodiment of a projectile suitable for use in the launcher-projectile assembly of FIG. 1. In the illustrated embodiment, the projectile includes a core 1224, which may be rigid in certain embodiments, and four outer members 1222. The rigid core 1224 may be the core 220 as described above. For example, the rigid core 1224 may have an overall spherical external surface for engagement with the head 120 of the launcher 100. The outer members 1222 may presents any desired geometric full or partial outline, such as a general cubular or rectangular shape that includes edges for a first bite curve 1230 and a second bite curve 1232. The first and the second bite curves 1230 and 1232 may be separated by one or more channels, such as the channels 214 that allow for breathing. In the illustrated example, only the bite curve 1232 is separated, but in other implementations, the first bite curve 1230 may also be separated by a channel. The first and second bite curves 1230 and 1232 enables a stable engagement when a pet bites onto the projectile. The projectile further includes bounce corners 1240 that provides irregular bouncing when the projectile lands on the ground. In some embodiments, the bounce corners 1240 may be a chamfer connecting two or more bite curves. In other embodiments, the outer members 1222 may present an irregular or non-symmetrical outer shape.

Figure 12:
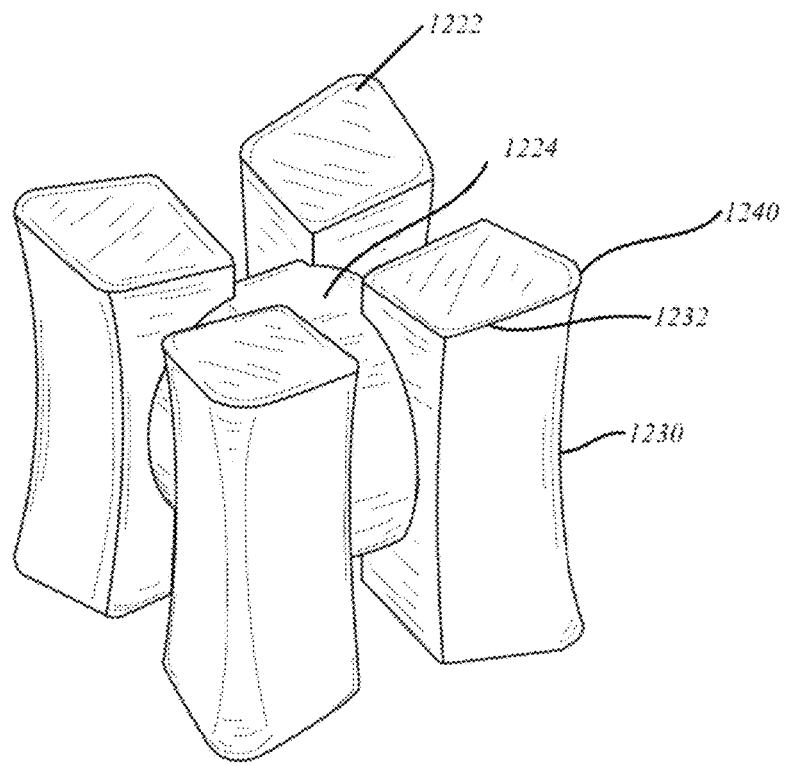
FIG. 12 is a perspective view of another embodiment of a projectile suitable for use in the launcher-projectile assembly of FIG. 1.
Figure 13:
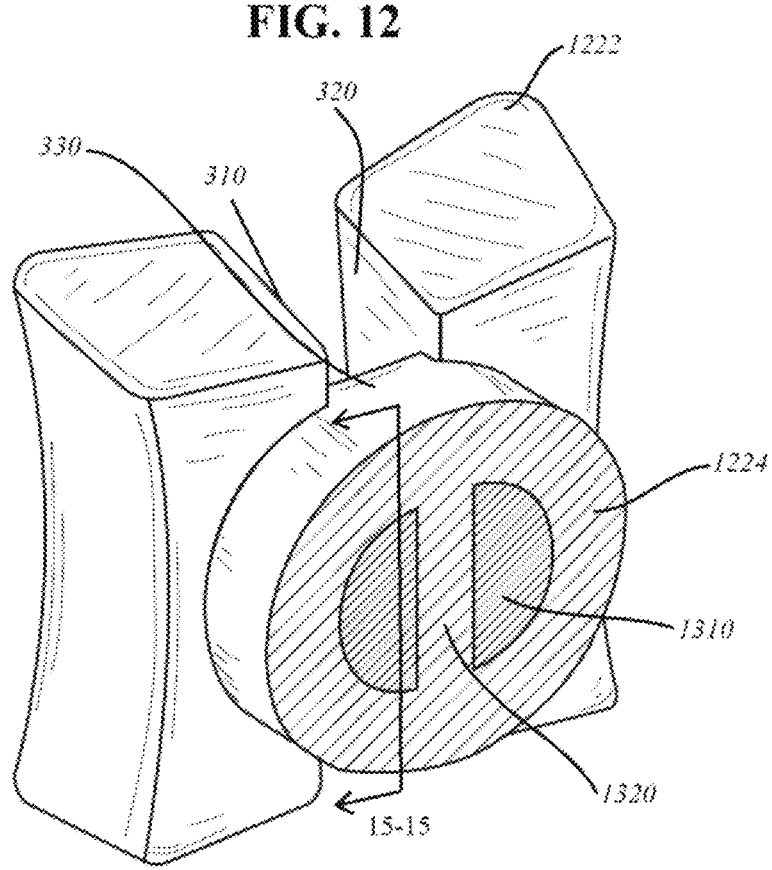
FIG. 13 is a perspective view of the sectioned projectile shown in FIG. 12.

FIG. 13 is a perspective view of the sectioned projectile shown in FIG. 12. FIG. 13 illustrates the interconnection between the four outer members 1222. For example, the rigid core 1224 may include one or more hollow channels that allow the outer members 1222 to be injection molded to have one or more physical inter-connections 1310. As illustrated, the rigid core 1224 may include a center pillar 1320 for guiding a specific flow direction for the materials forming the outer member 1222, and providing structural support and/or desired weight. In some embodiments, the center pillar 1320 may not be needed and the rigid core 1224 may have a hollow center. Other configurations of the two-material injection molding of the rigid core 1224 and the soft outer members 1222 are possible. Details of the current configurations are further shown in FIGS. 14 and 15.

Figure 14:
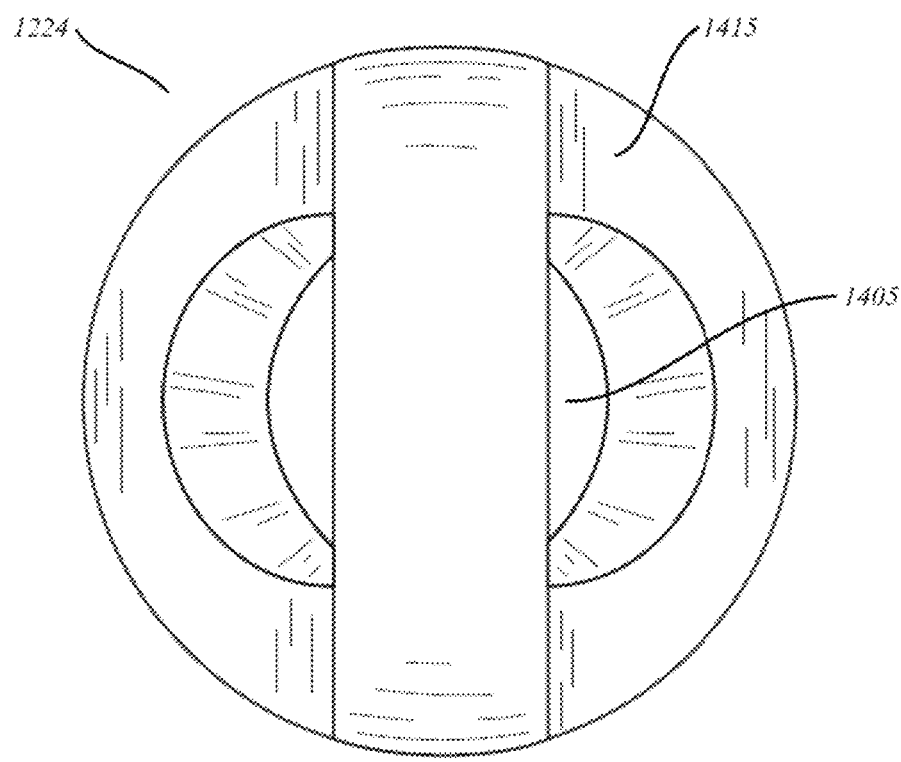
FIG. 14 is a side view of the core of the projectile shown in FIG. 12.
Figure 15:
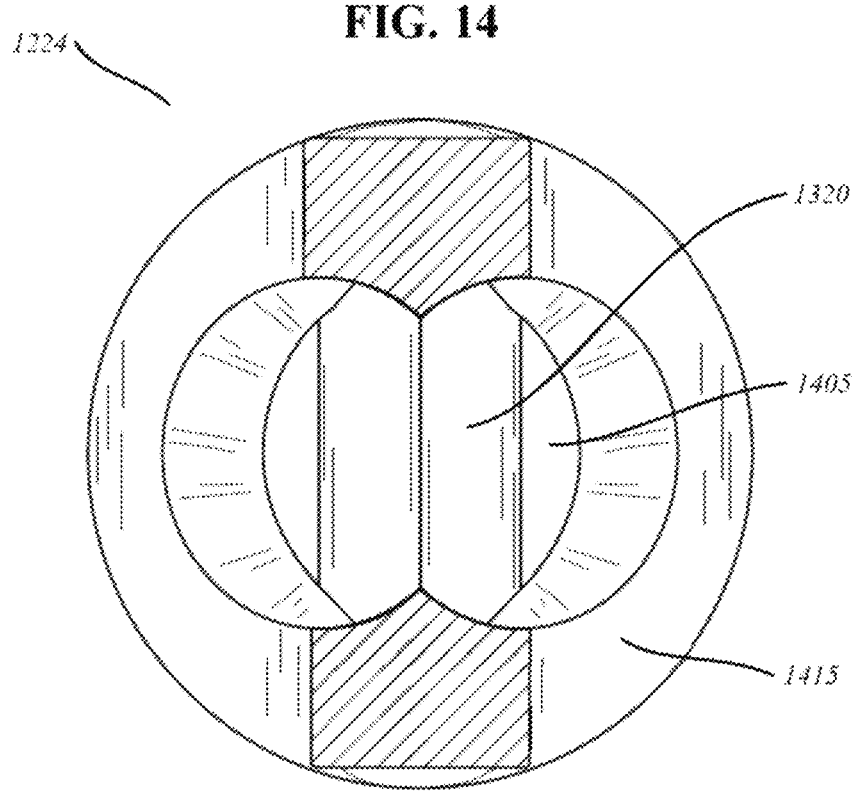
FIG. 15 is a cross sectional side view of the core of FIG. 14.

FIG. 14 is a side view of one embodiment of the rigid core 1224 of the projectile shown in FIG. 12. FIG. 15 is a cross-sectional side view of a portion of the core 1224 of FIG. 14. As illustrated, the rigid core 1224 includes a number of openings 1405 surrounded by a hard exterior 1415. The hard exterior 1415 may have a thickness depending on the desired strength or weight of the material used and/or the overall size of the projectile as intended for specific pets. The center pillar 1320 is shown as having a rectangular cross section and edges, in other embodiments, however, the pillar 1320 may be cylindrical or of other geometries. For example, in some embodiments, the mold opening 1405 may be annular in shape (such as a donut inside the spherical rigid core 1224) and the center pillar 1320 forms the center of the annular shape. Other configurations of the mold opening 1405 may be implemented, such as through interconnected holes, or any conduits, for linking the outer members 1222.

Figure 16:
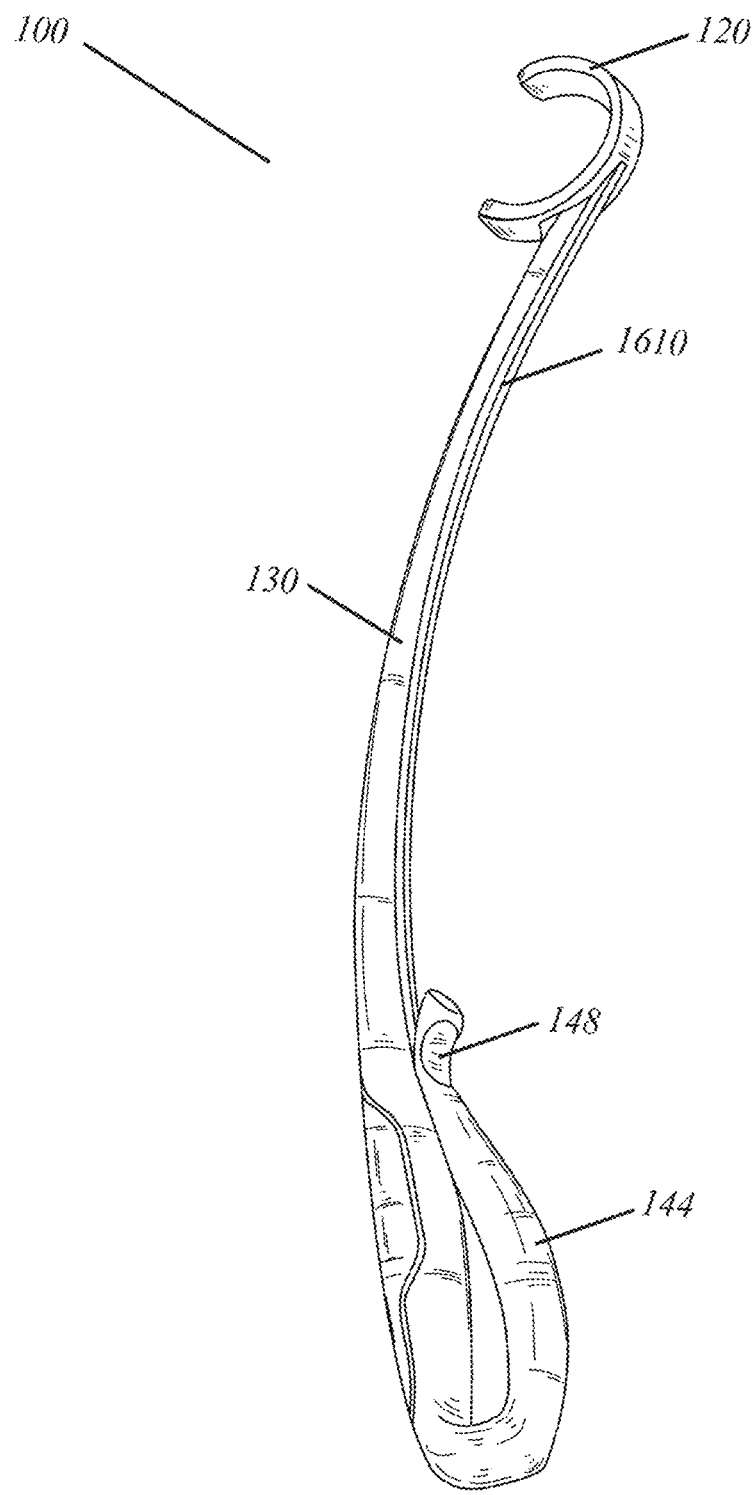
FIG. 16 is a perspective view of another embodiment of the launcher for use in the launcher-projectile assembly of FIG. 1.

FIG. 16 is a perspective view of another embodiment of the launcher 100 for use in the launcher-projectile assembly of FIG. 1. In this embodiment, a reinforcement rib or spine 1610 protrudes from a back side of the arm 130. In the example shown, the rib 1610 includes a rectangular cross section. The rib 1610 increases the bending stiffness as well as strength of the launcher 100. In other embodiments, the rib 1610 may include a different cross sectional shape, such as elliptical. In some other embodiments, the rib 1610 may protrude from the front side of the launcher 100, or from multiple sides. Other implementations and variations are possible.

Other implementations are possible. For example, the projectile 110 or 1020 may include outer members 210 or 1022 that are not spherical or ovoid in shape, such as the cubular shaped projectile illustrated in FIGS. 12-15, or any other desired shape, including non-symmetrical shapes. In some embodiments, the outer members may have cubical, elongated, or other shape profiles. Other variations may also be implemented depending on specific needs of particular pets or other requirements.

What is claimed is:

1. A launcher-projectile assembly comprising:
a launcher having a head; and
a projectile at least partially insertable into the head of the launcher, the projectile having a core and a member, the core includes an inner hollow portion and two or more external openings, and the member includes an inner member portion and an outer member portion, the outer member portion includes two or more extensions that extend from the inner member portion and through the two or more external openings of the core;
wherein the member is formed through injection molding, and the inner member portion of the member is positioned in the inner hollow portion of the core, and the two or more extensions of the outer member portion of the member are positioned external to the core through the two or more external openings of the core,
wherein the core and the two or more extensions of the outer member portion of the member form at least one channel having a bottom surface, a first side wall, and a second side wall, wherein the bottom surface of the at least one channel is an outer surface of the core, the first side wall of the at least one channel is a first side surface of at least one of the two or more extensions, and the second side wall of the at least one channel is a second side surface of at least one of the two or more extensions,
wherein the member is mechanically connected to the core at least partially through the inner hollow portion of the core and the two or more external openings of the core, and wherein the inner member portion of the member occupies the inner hollow portion of the core such that the inner member portion of the member is fixed relative to the inner hollow portion of the core, and wherein the projectile, when inserted into the head of the launcher, is held in place via the head of the launcher, wherein the head of the launcher at least partially contacts the bottom surface of the at least one channel of the projectile and wherein the head is at least partially laterally constrained by the first side wall of the at least one channel, such that the head holds more than the projectile's static gravitational weight.

2. The launcher-projectile assembly of claim 1, wherein the launcher further comprises an arm and a handle, wherein the arm connects the head to the handle, the arm configured to flex when launching the projectile.

3. The launcher-projectile assembly of claim 2, wherein the handle includes a clip shape, the clip shape forming a slot such that an open end of the handle is insertable into a pocket or a belt of a user, and wherein the handle is formed in an ergonomic grip profile including a thumb rest for receiving a thumb.

4. The launcher-projectile assembly of claim 2, wherein the handle is formed in an ergonomic grip profile including a number of finger indentations for receiving fingers and a thumb rest contoured for receiving a thumb.

5. The launcher-projectile assembly of claim 2, wherein the arm is telescopically extendable.

6. The launcher-projectile assembly of claim 2, wherein the arm is hinged such that the launcher is foldable to reduce an overall length.

7. The launcher-projectile assembly of claim 1, wherein:
the head is flexible and has a "C" shaped profile defined by an inner radius, a width, and a thickness; and
the core of the projectile has at least one curved portion having a radius of curvature about the same as the inner radius of the "C" shaped profile.

8. The launcher-projectile assembly of claim 7, wherein the core of the projectile has at least two curved portions both having a radius of curvature about the same as the inner radius of the "C" shaped profile, the at least two curved portions substantially orthogonal to each other, wherein at least one of the at least two curved portions is configured to be received by the head.

9. The launcher-projectile assembly of claim 1, wherein the member is made of a flexible material configured for pets to bite, and wherein the at least one channel forms an air passageway in case the projectile is stuck in an air passageway of a pet.

10. The launcher-projectile assembly of claim 1, wherein the core and the two or more extensions of the outer member portion of the member form at least two channels.

11. The launcher-projectile assembly of claim 1, wherein the two or more extensions of the outer member portion are molded to form a three-dimensional shape.

12. The launcher-projectile assembly of claim 1, wherein the head of the launcher includes a width that is greater than a width of the at least one channel between the first side wall and the second side wall of the at least one channel, and the head of the launcher elastically deforms when the projectile is inserted into the head of the launcher.

13. The launcher-projectile assembly of claim 1, wherein the launcher further includes a flexible arm portion, and wherein the flexible arm portion and the head of the launcher are made of a material having a high elastic modulus such that insignificant plastic deformations occur over time.

14. The launcher-projectile assembly of claim 1, wherein the outer surface of the core is rigid where the head contacts the bottom surface of the at least one channel.

15. The launcher-projectile assembly of claim 1, wherein the head of the launcher includes a width that is equal to or less than a distance between the first side wall and the second side wall of the at least one channel.

16. The launcher-projectile assembly of claim 1, wherein the core includes an internal volume that is hollow.

17. The launcher-projectile assembly of claim 1, wherein the core includes an internal volume with one or more hollow channels.

18. A launcher comprising:
a handle;
a head configured to engage a projectile, the projectile comprising:
a core comprising an inner hollow portion and two or more external openings, and
a member comprising an inner member portion and an outer member portion, the outer member portion includes two or more extensions that extend from the inner member portion and through the two or more external openings of the core, wherein the member is formed through injection molding, and the inner member portion of the member is positioned in the inner hollow portion of the core, and the two or more extensions of the outer member portion of the member are positioned external to the core through the two or more external openings of the core,
wherein the core and the two or more extensions of the outer member portion of the member form at least one channel having a bottom surface, a first side wall, and a second side wall, wherein the bottom surface of the at least one channel is an outer surface of the core, the first side wall of the at least one channel is a first side surface of at least one of the two or more extensions, and the second side wall of the at least one channel is a second side surface of at least one of the two or more extensions,
wherein the member is mechanically connected to the core at least partially through the inner hollow portion of the core and the two or more external openings of the core such that the inner member portion of the member is fixed relative to the inner hollow portion of the core, and
wherein the at least one channel is configured to receive a head of a launcher, wherein the head contacts the bottom surface of the at least one channel and is at least partially laterally constrained by the first side wall of the at least one channel, such that the head of the launcher holds the projectile.

19. A projectile comprising:
a core comprising an inner hollow portion and two or more external openings; and
a member comprising an inner member portion and an outer member portion, the outer member portion includes two or more extensions that extend from the inner member portion and through the two or more external openings of the core,
wherein the member is formed through injection molding, and the inner member portion of the member is positioned in the inner hollow portion of the core, and the two or more extensions of the outer member portion of the member are positioned external to the core through the two or more external openings of the core,
wherein the core and the two or more extensions of the outer member portion of the member form at least one channel having a bottom surface, a first side wall, and a second side wall, wherein the bottom surface of the at least one channel is an outer surface of the core, the first side wall of the at least one channel is a first side surface of at least one of the two or more extensions, and the second side wall of the at least one channel is a second side surface of at least one of the two or more extensions, wherein the member is mechanically connected to the core at least partially through the inner hollow portion of the core and the two or more external openings of the core such that the inner member portion of the member is fixed relative to the inner hollow portion of the core, and wherein the at least one channel is configured to receive a head of a launcher, wherein the head contacts the bottom surface of the at least one channel and is at least partially laterally constrained by the first side wall of the at least one channel, such that the head of the launcher holds the projectile.

* * * * *